(12) United States Patent
Gillman et al.

(10) Patent No.: US 6,582,482 B2
(45) Date of Patent: Jun. 24, 2003

(54) TIN-CLAD SUBSTRATES FOR USE AS CURRENT COLLECTORS, BATTERIES COMPRISED THEREOF AND METHODS FOR PREPARING SAME

(75) Inventors: Leland M. Gillman, Denver, CO (US); Ramesh C. Bhardwaj, Walnut, CA (US)

(73) Assignee: GP Batteries International, Ltd., San Diego, CA (US)

( * ) Notice: Subject to any disclaimer, the term of this patent is extended or adjusted under 35 U.S.C. 154(b) by 52 days.

(21) Appl. No.: 09/732,383

(22) Filed: Dec. 7, 2000

(65) Prior Publication Data

US 2001/0001692 A1 May 24, 2001

Related U.S. Application Data

(62) Division of application No. 09/270,265, filed on Mar. 15, 1999, now abandoned.

(51) Int. Cl.[7] .......................... H01M 6/00; H01M 4/72; B23P 13/00
(52) U.S. Cl. .................. 29/623.5; 29/623.1; 29/2; 429/233
(58) Field of Search ................... 429/233, 239, 429/245, 243, 244, 209, 235, 236, 225, 226; 29/623.5, 623.4, 623.1, 2

(56) References Cited

U.S. PATENT DOCUMENTS 5,820,639 A * 10/1998 Snyder et al. ............. 29/623.5

FOREIGN PATENT DOCUMENTS

JP 4-104466 * 4/1992 ............ H01M/4/68

* cited by examiner

Primary Examiner—Stephen Kalafut
Assistant Examiner—R Alejandro
(74) Attorney, Agent, or Firm—Procopio, Cory, Hargreaves & Savitch, LLP (57) ABSTRACT

The present invention provides a current collector for a battery which comprises a lead or lead alloy substrate and a thin cladding of tin, batteries utilizing such a current collector and methods for manufacturing such batteries. Preferably the tin cladding is composed of substantially pure tin and the concentration of the tin cladding relative to the weight of the current collector (i.e., the combined weight of the substrate and cladding) is less than 4% by weight. The tin cladding forms a noncontinuous layer over the outer surface of the substrate such that there are interspersed regions of lead and tin at the current collector surface. Batteries utilizing such current collectors exhibit marked improvement in performance compared to similar cells composed of tin alloys. In particular, batteries using current collectors of the present design offer superior cycle life and shelf life performance.

20 Claims, 6 Drawing Sheets

TIN-CLAD SUBSTRATES FOR USE AS CURRENT COLLECTORS, BATTERIES COMPRISED THEREOF AND METHODS FOR PREPARING SAME

This is a divisional application of Ser. No. 09/270,265 filed Mar. 15, 1999, now abandoned which is pending, the contents of which are hereby incorporated by reference.

FIELD OF INVENTION

The present invention relates to the field of current collectors, electrodes and lead-acid batteries. More particularly, the present invention relates to current collectors composed of a lead or lead alloy substrate and a tin cladding applied to the substrate surface and batteries utilizing such current collectors, such batteries being characterized by both high cycle life and long shelf life. The present invention further relates to methods for manufacturing batteries utilizing this type of current collector.

BACKGROUND OF INVENTION

Despite considerable research into the development of improved electrochemical storage devices, the lead-acid battery remains a predominant device for delivering electrical current in many electrical operations. A conventional lead-acid battery such as the valve-regulated lead-acid (VRLA) battery is comprised of a plurality of cells. Each cell typically includes a set of interleaved monopolar positive and negative electrodes or "plates." The electrodes typically are composed of a lead or lead-alloy current collector and an electrochemically active paste which is coated onto a surface of the current collector. The current collector typically is in the form of a grid but may also be in other forms such as a solid foil or film. The paste on the positive electrode plate contains lead dioxide when charged and is called the positive active material; the negative electrode contains a negative active material, typically sponge lead. Electrodes of opposite polarity are separated one from the other by a porous electrically insulating separator material such as a glass microfiber mat. The cell is completed by adding an acid electrolyte between the positive and negative electrodes and enclosing the entire assembly within a suitable case. A charging process activates the cell.

A major goal in the field of lead-acid batteries is to develop batteries having increased cycle life and longer shelf life. Cycle life is defined as the number of discharging and recharging cycles a battery can sustain while still delivering a certain level of electricity. Cycle life is dependent upon a number of factors including testing conditions and cell construction. With regard to testing parameters, for instance, a cell which achieves 80% of its initial amp-hour rating after 500 cycles but delivers only 50% of its initial amp-hour rating after 1,000 cycles will have two different cycle life values, depending upon whether the cell is rated at 80% or 50% of initial capacity. A related parameter, "total useable capacity," refers to the number of cycles achieved during the cell's life multiplied by the amp-hours delivered during each cycle. It is equivalent to the area under a curve in which discharge capacity (in amp-hours) is plotted against cycle number and is also a measure of the useful work a cell can provide.

Shelf life simply refers to the usable life of a battery when it is not in use. The shelf life of batteries is affected by a process called "self-discharge," i.e., chemical reactions within the cell which cause the consumption of electrolyte, even when the cell is not exposed to an external load. The consumption of electrolyte through self-discharge decreases discharge capacity because the discharge capacity of a cell is proportional to the specific gravity, or concentration, of electrolyte within the cell. Self-discharge not only reduces storage time and discharge capacity but also results in voltage decay, or a decrease in open circuit voltage.

Cycle life and shelf life are dependent in large measure on the chemistry which occurs at the interface between the current collector of the positive electrode and the electrochemically active paste. This interface is referred to as the "corrosion layer" or "passivation layer" depending on the conductivity of the layer. While all of the chemistry that takes place at this interface is not fully understood, battery technologists currently believe that a conductive corrosion layer (which may be a semi-conducting layer) is necessary to obtain long cycle life in lead-acid batteries. However, with certain lead and lead-alloy grids or foils, in particular pure lead, lead-calcium and lead-low tin compositions, a passivation layer (i.e., a non-conducting layer) can form. Passivation layers are composed primarily of lead oxide (PbO). The lead oxide acts as an electrical insulator and can reduce conductivity such that current cannot pass from the active material through the layer without a significant voltage loss. Thus, whether a conductive or passivation layer exists at the current collector/paste interface can dramatically impact the electrochemical properties of a cell.

In particular, the formation of a conductive corrosion layer, achieved at least in part through appropriate selection of current collector composition, beneficially results in a cell having a long cycle life. However, the drawback to a corrosion layer is that the cell generally has reduced shelf life due to the ongoing corrosion or oxidation of the lead or lead alloy current collector which consumes needed electrolyte. In contrast, current collectors whose composition tends to create passivation layers have excellent shelf life but relatively poor cycle life and recovery from deep discharge and stand. The extended shelf life is a consequence of the passivation of the corrosion layer which protects the current collector from corrosion and self-discharge and thus voltage decay; yet, as noted above, the passivation process also acts to inhibit current flow during charging, thereby reducing cycle life. Thus, cycle life and shelf life are inversely related with regard to the effect of the conductive/passivation layer. A conductive corrosion layer enhances cycle life but reduces shelf life; a passivation layer, in contrast, negatively affects cycle life but increases shelf life. Consequently, cell design involves choosing materials with the realization that a composition which enhances cycle life typically involves a tradeoff wherein shelf life is sacrificed and vice versa.

One approach to optimizing cycle life and shelf life has been to utilize lead-tin alloy current collectors in place of traditional pure lead current collectors. It has been found that the inclusion of small percentages of tin in the grid reduces the formation of a passivation layer, thereby enhancing the cycle life of a cell. It is thought that a relatively high tin content results in the tin being corroded, presumably to soluble tin(II) or insoluble $SnO_2$. The corroded tin compounds are incorporated into the passivation layer where the tin compounds act as a conductor to ameliorate the insulative effects of the passivation layer, thereby enhancing conductivity and current flow between the current collector and the positive active material.

Several patents describe current collectors in which a lead-tin alloy film is superimposed on a lead or lead alloy substrate. United States patents describing this approach include U.S. Pat. No. 4,107,407 to Koch, U.S. Pat. Nos. 4,939,051 and 4,805,277 to Yasuda et al., and U.S. Pat. No. 4,761,356 to Kobayashi et al. Unlike the present invention, these patents do not describe the use of a pure tin cladding, nor do they describe current collectors wherein the tin is distributed only at the very outer surfaces of the current collectors and especially wherein the tin is nonhomogeneously distributed at the surface such that there are particles or regions of tin interspersed among high lead regions at the current collector surface.

In U.S. Pat. No. 5,024,908 (the "908 Patent") to Terada et al., a tin-coated substrate is prepared for use in a lead acid cell. However, the 908 Patent teaches away from the current collectors of the present invention in which tin is clad to the outer surface of a substrate by stating that there are problems associated with using current collectors which are tin plated. In particular, the 908 Patent claims that during charging and formation the tin plating can disintegrate to create tin particles that can form deposits at the cathodic plates; these deposits, in turn, can cause a short circuit in the cell. Hence, the 908 Patent teaches that the tin-coated substrate of the current collector should be heated at a temperature of at least 170° C. in order to effectively diffuse the tin into the substrate matrix. This contrasts sharply with the present invention wherein the tin has been found to provide significant enhancement in cell performance if located at the surface of the current collector.

Because existing electrochemical cells fail to fully optimize both cycle life and shelf life, there remains a need for current collectors, batteries and methods for making these devices which can significantly increase the cycle life of a lead-acid battery while at the same time maintaining long shelf life, or alternatively, which optimize shelf life without compromising cycle life.

SUMMARY OF THE INVENTION

The present invention addresses and fulfills the need identified above. In particular, the present invention generally provides improved current collector compositions, batteries utilizing such current collectors and methods for manufacturing such batteries, wherein the batteries have both improved shelf life and cycling performance relative to other prior art batteries.

More specifically, the present invention provides a current collector which comprises a tin-clad lead or lead alloy substrate and lead-acid batteries based upon such current collectors. Preferably, the cladding is substantially pure tin and comprises less than 4% of the current collector by weight (all tin cladding weight percentages listed herein are expressed relative to the combined weight of the lead or lead alloy substrate and the tin cladding which comprise the current collector).

The tin cladding enhances shelf life and cycle life performance. The current inventors have found that the key to simultaneously achieving long shelf life and cycle life is to have a semiconducting layer on the outer surface of the current collector. The current collectors provided for in the current invention satisfies this important criterion. Batteries utilizing the tin-clad substrates described herein have superior cycle life and shelf life performance relative to prior art cells. The particular enhancement observed is a function of the tin concentration at the current collector surface. In general, a higher concentration of tin results in particularly high cycle life. At lower tin cladding levels, shelf life performance can be optimized.

The current collectors provided in the current invention have the further advantage that they can be manufactured using standard processing techniques and require less materials, especially tin, thereby reducing manufacturing costs. The current collectors can also be used with all types of.electrochemically active pastes and paste additives to achieve similar performance enhancement. The tin-cladding can be applied to substantially pure lead or to a lead alloy substrate and yield a current collector capable of delivering improved performance characteristics when incorporated in a battery. Further, when such current collectors are used in batteries, the tin cladding also maintains the deep discharge recovery of the cell, while preserving the sealed, valve-regulated characteristics of the battery.

The current collector provided by the present invention comprises a lead or lead alloy substrate and a tin cladding located at the surface of the substrate. Preferably, the current collector includes a thin lead-based foil or film having two primary faces to which a very thin layer of tin cladding is applied. The lead substrate may optionally be either substantially pure lead or a lead-alloy. If prepared from substantially pure lead, the lead substrate is preferably 99.9% lead, and most preferably 99.99% lead (all purity values listed herein are on a weight percent basis). If the lead substrate is a lead alloy, the lead alloy is preferably a lead-tin, lead-antimony, lead-calcium-tin or lead-calcium-antimony alloy, although other alloy compositions could be used as well. The current collector may include a variety of shapes or forms, including for example a grid or a substantially non-perforated foil or film. The current collector is typically less than 0.07 inches thick; however, preferably the current collector is less than 0.007 inches thick, and most preferably is approximately 0.002 to 0.003 inches thick.

The tin cladding clad to the lead substrate does not form a continuous layer over the surface of the lead substrate. Hence, the lead or lead alloy substrate breaks through the tin cladding, leaving only small particles or regions (depending on the tin concentration) of concentrated tin on the electrode surface. Thus, the current collector surface has pockets of high tin density separated by regions which have no tin.

The tin cladding is preferably substantially pure tin, although this is not required. If substantially pure tin is used, the tin preferably has a purity of at least 99.9%. The concentration of the tin cladding relative to the combined weight of the lead substrate and cladding is preferably less than 4%, more preferably between 0.001% and 0.5%, and most preferably between 0.001% and 0.05%. The thickness of the tin cladding preferably ranges from 0.01 to 100 microns, and most preferably between 0.5 and 2 microns.

The present invention further provides electrochemical cells or batteries utilizing the current collectors described above. In particular, the cells are characterized by positive and negative electrodes which are composed of the current collectors described above and an electrochemically active paste or active material Although preferably both the positive and negative electrodes or plates include the current collectors described herein, it is possible to make cells in which only the positive electrode includes such current collectors. The positive and negative electrodes are arranged in an alternating fashion and are separated by an electrically insulating separator, the combination of a positive electrode, separator and negative electrode defining a unit cell. A unit cell or collection of unit cells encapsulated in a container having an electrolyte yields a lead-acid battery having both superior cycle life and shelf life characteristics.

The positive and negative electrodes can be of a variety of sizes and thicknesses. The preferred thickness of the positive and negative electrodes (current collector plus paste on both sides of the current collector) is preferably less than 0.07 inches and most preferably between 0.009 and 0.015 inches.

The electrochemically active paste can be an unsulfated paste but preferably is a sulfated paste. More preferably, the paste is a sulfated paste containing a tin compound. The tin compound can include tin sulfate, SnO, metallic tin, tin (II) salts and tin (IV) salts. In an especially preferred embodiment, the paste is a sulfated paste which includes tin sulfate, the tin sulfate concentration preferably being between approximately 0.1 and 2.0 percent of the sulfated paste by weight.

Additionally, the present invention further provides a method of manufacturing batteries wherein at least the positive electrode includes a current collector as described herein. The method involves preparing a positive current collector by cladding an outer surface of a lead or lead alloy substrate with a tin cladding and preparing a negative current collector, which preferably also involves cladding a foil or film with tin. A separator is positioned between the positive and negative current collectors. The combination of a positive and negative current collector and the separator imposed therebetween, or alternatively a plurality of positive and negative current collectors and their associated separators, are then encapsulated with an electrolyte in a container.

DETAILED DESCRIPTION OF THE PREFERRED EMBODIMENTS

It has been found that current collectors comprised of a lead or lead alloy substrate and a thin cladding of tin located at the surface of the current collector can significantly increase the shelf life and cycle life performance characteristics of batteries containing such current collectors relative to prior art batteries. At higher tin concentrations, cycle life is optimized; whereas at lower tin concentrations, shelf life performance is especially enhanced. However, in general, batteries utilizing the current collectors described herein exhibit both superior shelf life and cycle life compared to prior art batteries, including batteries utilizing current collectors composed of a lead-tin alloy.

Figure 1:
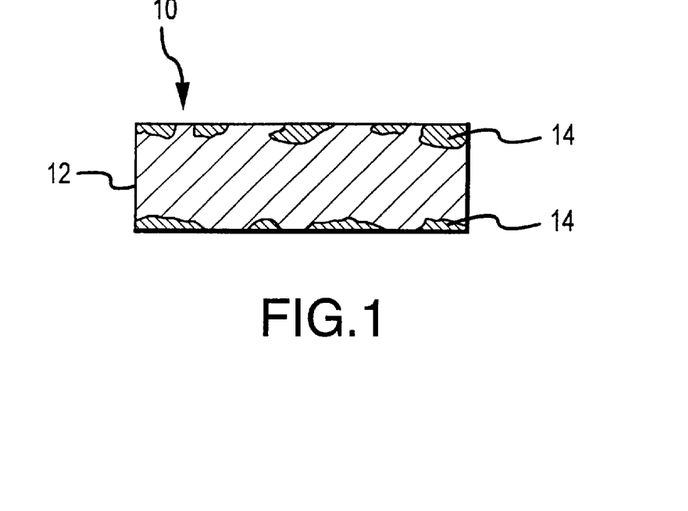
FIG. 1 is an enlarged cross-sectional view of a current collector according to the present invention illustrating that the tin cladding forms a noncontinuous layer on the surface of the current collector.

The general structure of a current collector according to the present invention is illustrated in FIG. 1. The current collector 10 comprises a lead or lead alloy substrate 12 and a tin cladding 14 which is clad to the outer surfaces of the lead substrate. The cladding relative to the weight of the current collector (i.e., the lead or lead alloy substrate plus the tin cladding) is preferably less than 4 percent by weight (all tin cladding weight percentages listed herein are expressed relative to the combined weight of the substrate and the tin cladding which comprise the current collector). As shown in FIG. 1, the tin cladding 14 is preferably clad onto both faces of the substrate 12, although the tin cladding could simply be applied to a single face. The tin cladding 14 exists at the surface of the current collector and does not completely cover the surfaces of the substrate 12. Instead, the tin cladding 14 exists as a non-continuous layer such that regions of lead are exposed at the current collector surface and are located between pockets of tin cladding.

The substrate 12 used in the current collector 10 can be substantially pure lead or a lead alloy. If substantially pure lead is used, the lead preferably has a purity of at least 99.9%, and most preferably 99.99%. In those cases where a lead-alloy is used for the substrate, the lead alloy may include any of the standard alloys used in lead-acid batteries. Preferred alloys include lead-tin, lead-antimony, lead-calcium-tin, and lead-calcium-antimony alloys. For the lead-tin alloy, tin is preferably present at 0.2% to 3.0% by weight. In the case of the lead-calcium-tin alloy, the preferred composition is about 0.08% calcium, about 0.5% tin by weight and the remainder essentially lead (other trace impurities may also be present). Likewise, for lead-calcium-antimony alloys, the composition is preferably about 0.08% calcium, 0.5% antimony by weight and the balance lead (except for trace impurities).

The thickness of the current collector 10 can be of a variety of thicknesses but generally is less than 0.07 inches, preferably is less than 0.007 inches and, most preferably, is between approximately 0.002 and 0.003 inches thick.

The tin used to clad the substrate 12 is preferably substantially pure tin. The phrase "substantially pure tin" as used herein is defined to mean tin in which any other metals present are at such low levels that they do not provide a significant alloying effect; preferably, such tin is at least 99.9% pure. In the case where the substrate 12 is a foil or film or related shape having two primary faces, one, or preferably both faces, are clad with tin. As noted above, the cladding 14 on the face of the substrate forms a broken or noncontinuous layer so that the electrode surface has interspersed regions or pockets of lead and tin as illustrated in FIG. 1.

Typically, the tin cladding 14 accounts for less than 4% of the current collector by weight. However, the tin cladding concentration is more preferably between 0.001% and 0.5%, and most preferably is between 0.001% and 0.05%, by weight. In general, the tin cladding 14 covers between 1% and 99%, and preferably between 5% and 50%, of the outer surface of the substrate. The thickness of the tin cladding preferably ranges from 0.01 to 100 microns, and most preferably between 0.5 and 2 microns.

The current collector 10 preferably is in the form of a substantially non-perforated, thin foil or film (the term "substantially non-perforated" as used herein means that the substrate is not a grid but is essentially a solid material, although a very limited number of small holes in the substrate may exist). However, the tin-clad foils or films described herein can be can be further processed into the conventional grid using standard expansion or punching techniques, such as that described in U.S. Pat. No. 3,881,952 to Wheadon et al., which is hereby incorporated by reference herein. The thin, substantially non-perforated foil or film is preferred over a grid because the thin, non-perforated foils or films significantly increase the surface area and result in exceptionally high discharge and charge rates. In particular, the ratio of the surface area of the foil to the amount of paste or active material is increased which greatly enhances the utilization of the active material.

The current collectors of the present invention differ from those prepared by sandwiching a substrate between lead-tin alloy sheets in that the cladding in the present invention may be substantially pure tin rather than a lead-tin alloy. Further, the tin in the current collectors described herein is concentrated and nonhomogeneously distributed at the outer surface of the current collector rather than homogeneously distributed throughout the alloy film as is characteristic of alloys.

The interspersed regions of pure lead and pure tin at the surface of the current collector is believed to enhance cell performance for the following reason, although it is not intended that the basis for the improved performance be limited to this particular explanation. The exposed lead on the current collector surface can react with the sulfuric acid electrolyte to form PbO, $PbO_2$ and lead sulfate some of which are non-conducting species which can partially passivate the current collector. These compounds protect the current collector from excessive corrosion and thereby increase shelf life. The regions of pure tin at the current collector surface, on the other hand, react with sulfuric acid to form tin sulfate and tin oxide. These corrosion products stay in the corrosion layer and also migrate to the positive active material during cycling and are able to maintain the conductivity of the positive material, thus resulting in higher cycle life. Thus, the current collector of the present invention provides an appropriate balance of localized regions of high tin and high lead concentrations at the current collector surface. The result is a semi-conducting layer at the surface of the current collector. While there is sufficient exposed lead regions to form non-conducting species which protect the current collector from oxidation, there is also sufficient tin localized at the surface to maintain conductivity.

Figure 3:
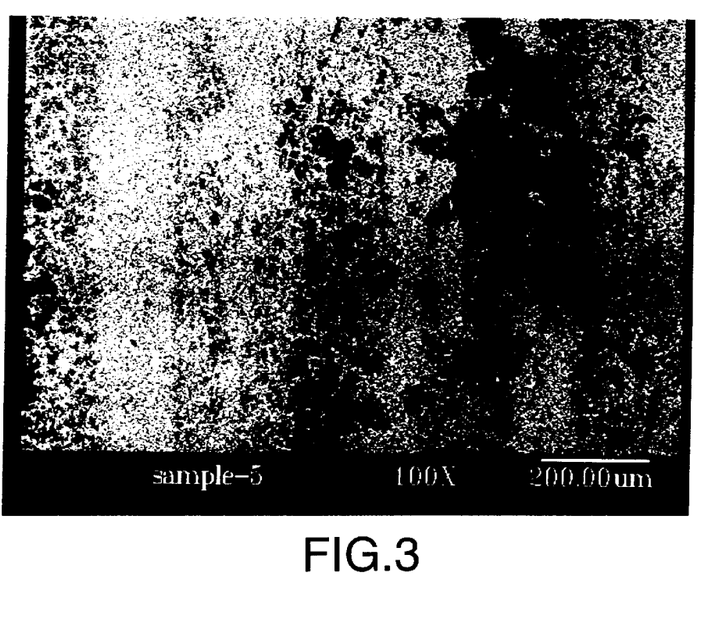
FIGS. 3–5 are photomicrographs of a tin-clad foil according to the present invention which were taken with a scanning electron microscope using backscatter to render the tin cladding visible (0.33% tin cladding).
Figure 4:
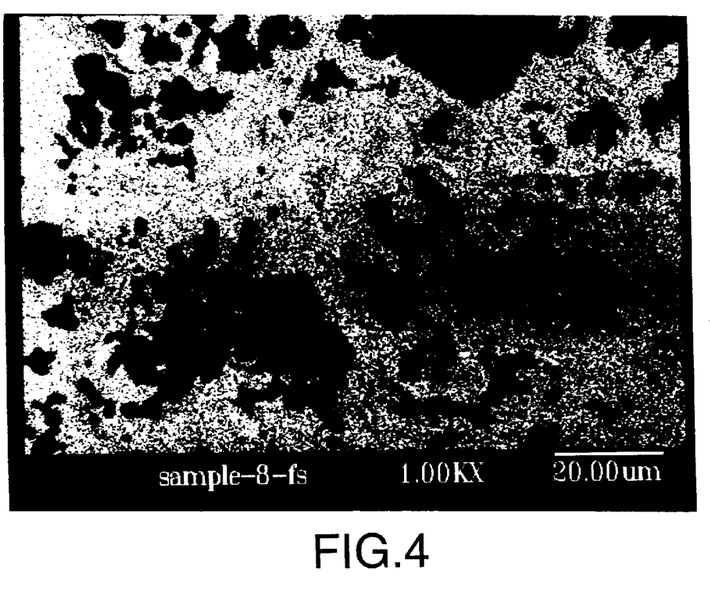

Examples of current collectors according to the present invention which have a noncontinuous distribution of tin at the current collector surface are shown in FIGS. 3–5 and 6–7, which are photomicrographs taken with a scanning electron microscope (SEM). FIG. 3 is a photomicrograph of a tin-clad foil obtained using a backscatter technique of a tin-clad foil wherein the tin cladding concentration is 0.33%. FIG. 3 clearly shows the regions containing tin (darker regions) and those regions without tin (lighter regions), i.e., the exposed lead foil (magnification=100×; white bar scale=200.00 microns). In this particular case, tin covers less than 10% of the lead foil surface. Thus, relatively large regions of lead are exposed at the current collector surface and are interspersed between smaller pockets of substantially pure tin. The photomicrograph in FIG. 4 is simply a closeup view of a selected region from that shown in FIG. 3 which more clearly shows the high tin pockets (dark regions) dispersed among the exposed regions of lead (lighter colored regions) (magnification=1,000×; white bar scale=20.00 microns).

Figure 6:
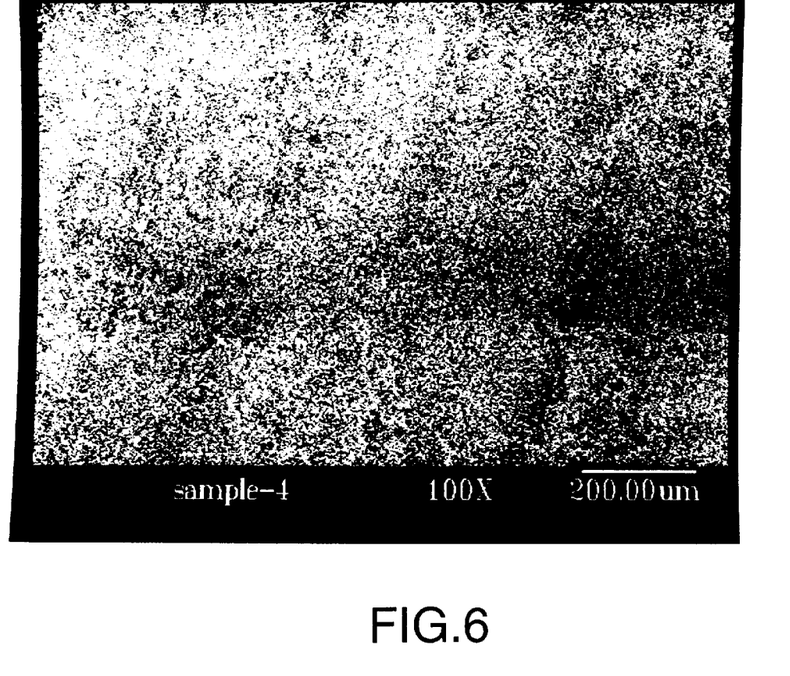
FIGS. 6–7 are additional photomicrographs of a tin-clad foil according to the present invention (0.05% tin cladding).
Figure 7:
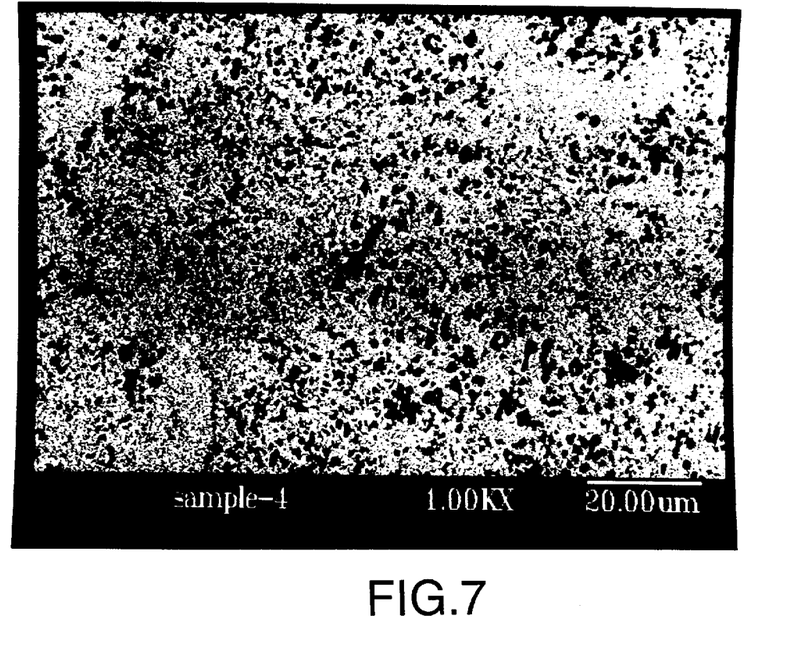

FIG. 6 is a photomicrograph of a second tin-clad foil in which the tin cladding concentration is 0.05% (magnification=100×); FIG. 7 is the same foil at higher magnification (magnification=1000×). Again, the tin particles appear as dark spots, whereas the lead regions appear lighter. Like the 0.33% tin-clad foils shown in FIGS. 3 and 4, the current collector surface contains particles of tin interspersed among exposed lead regions, although the particles of tin are smaller as compared those in the 0.33% tin-clad foil.

Figure 8:
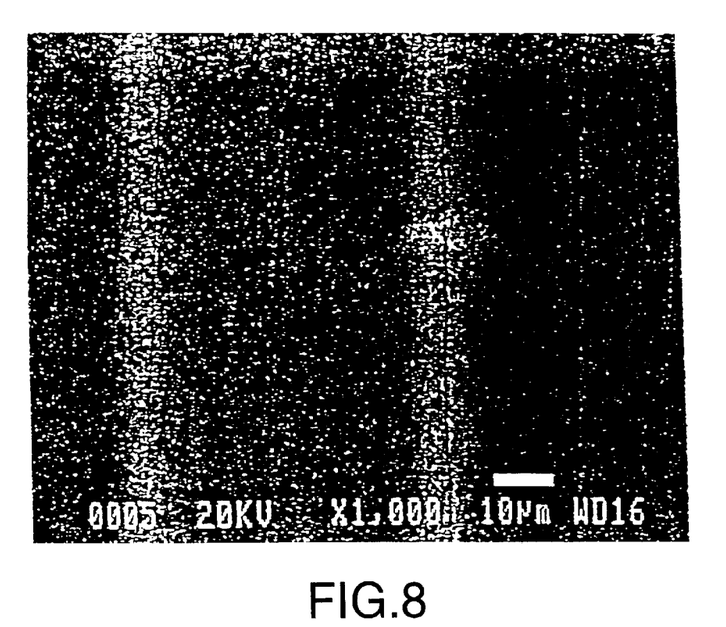
FIG. 8 is a photomicrograph of a lead-tin alloy foil (1% tin).

For comparison, FIG. 8 is a photomicrograph of a lead-tin alloy wherein the tin concentration is 1% by weight. As can be seen from FIG. 8, the lead tin alloy is not detectable by the SEM backscatter method (i.e., note the lack of interspersed light and dark regions), a consequence of the homogeneous distribution of tin throughout the foil. Similarly, for other current collectors which are clad with a lead-tin alloy film, the film exists as a continuous and unbroken layer across the surface of the substrate and the tin is homogeneously distributed throughout the alloy cladding. This contrasts with the present invention wherein the tin cladding does not form a continuous layer and the tin is not homogeneously distributed over the substrate surface; instead, the tin cladding exists in pockets or localized high tin regions. Furthermore, the tin is localized at the foil surface.

Figure 5:
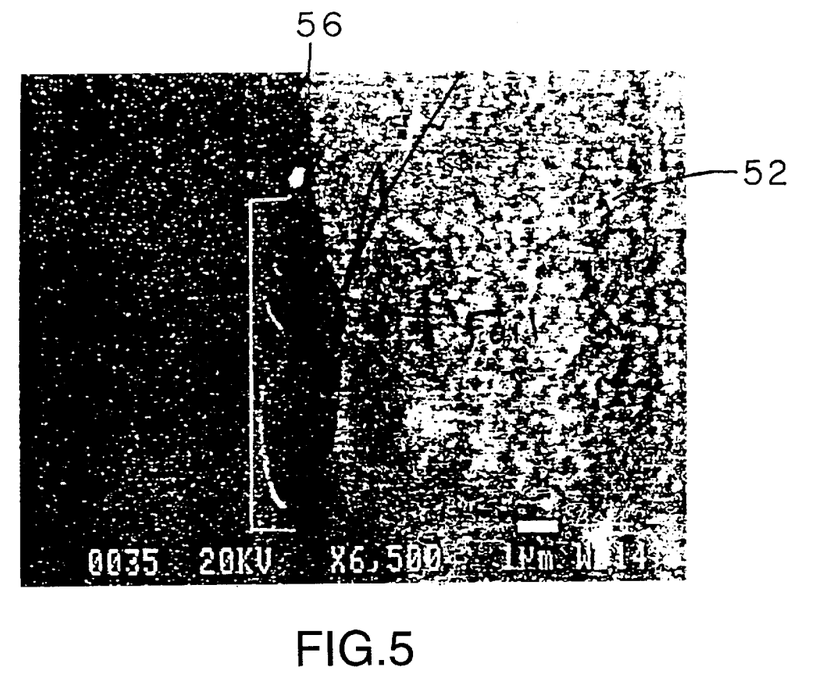

FIG. 5 provides a cross-sectional view of a tin-clad lead foil which illustrates that the tin cladding exists at the foil surface. The lead foil 52 appears as the lighter section on the right hand side of the photomicrograph; the dark region on the left hand side is the potting epoxy. The lead foil surface 56 is the vertical line down the center where the dark and light regions meet. A region of high tin concentration can be seen at the lead foil surface (area enclosed by white bracket). A high tin region is seen by backscatter scanning electron microscopy to have a thickness of 1 micron or less. An Energy Dispersive X-Ray (EDX) spectrum of a tin region confirms that the tin cladding at the current collector surface is essentially pure tin.

One method for preparing a current collector according to the present invention is as follows. A billet of substantially pure tin is rolled to a thickness of about 1/16 inch to 1/8 inch. The resulting substantially pure tin sheet is then placed on one side of an approximately 2 inch thick slab of pure lead or lead alloy. This two-layer composite is rolled down to a thickness of about 0.025 inches, resulting in a lead-tin composite sheet having tin impregnated on one surface of the two-layer composite. One sheet each of this lead-tin composite is then placed on the top and bottom sides of another 2 inch thick slab of pure lead or lead alloy to form a 3-layer sandwich (the lead-tin composite sheets are oriented so that the tin cladding on the lead-tin composite is on the outside surfaces of the 3-layer sandwich). This 3-layer sandwich is then rolled down to the desired thickness, generally less than 0.07 inches, preferably less than 0.007 inches, and most preferably between 0.002 and 0.003 inches. Because this production method employs standard sheet bar casters and rolling mills, processing is not difficult and the method reduces material costs compared to other approaches for manufacturing tin-containing current collectors. Although the method just described utilizes a strip rolling method for bonding the tin cladding to the lead substrate, other bonding methods could be utilized as well, such as tin sputtering, plasma coating, electroplating, electroless plating or ion implantation.

Figure 2:
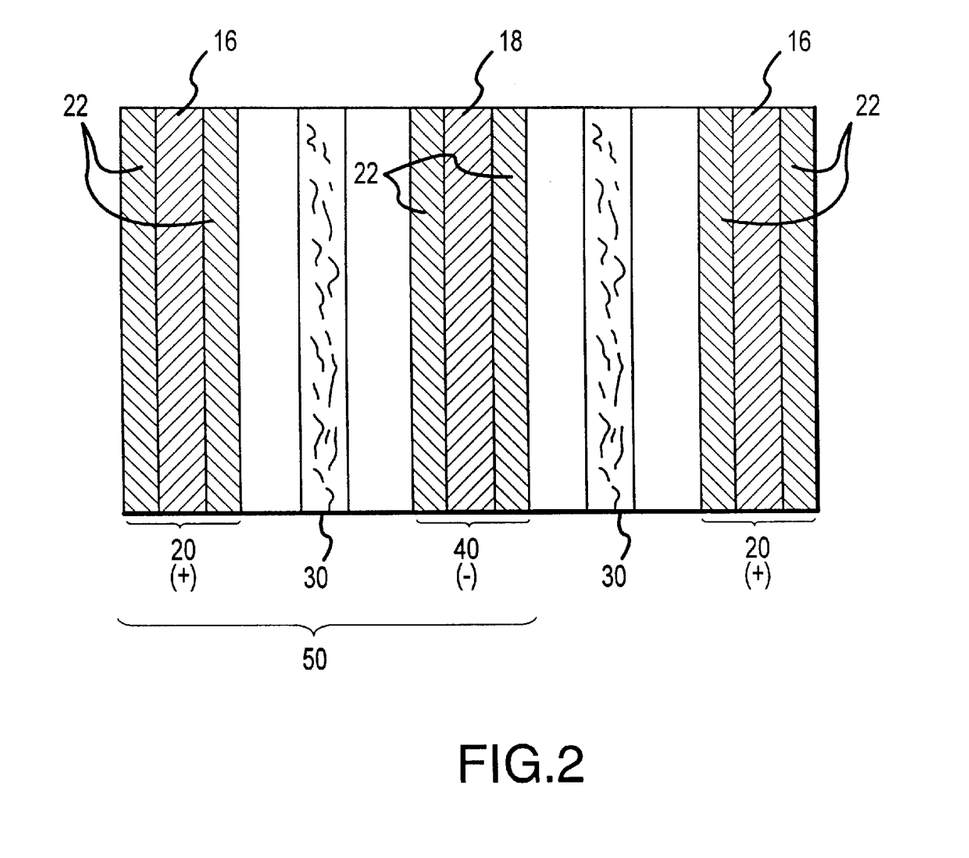
FIG. 2 is an exploded diagrammatic cross-sectional view of the alternating positive and negative electrodes that are separated by separators according to an embodiment of the present invention.

The current collectors described herein can be used in the construction of a battery wherein shelf life and cycle life can both be increased significantly over prior art batteries. An example of how the current collectors described herein can be incorporated into a battery is shown in FIG. 2 (the current collectors in FIG. 2 are shown without the cladding layer for the sake of clarity). FIG. 2 is an enlarged cross-sectional view of a battery according to the current invention which includes positive electrodes 20 alternately arranged with negative electrodes 40. Positive electrode 20 includes a positive current collector 16 and an electrochemically active paste 22; similarly, negative electrode 40 includes a negative current collector 18 and electrochemically active paste 22 (as used herein, the term "positive current collector" refers to the current collector which is electrically connected to the positive terminal of a battery; the term "negative current collector" refers to the current collector which is electrically connected to the negative terminal. The composition of the positive and negative current collectors can be, but need not be, the same). Although FIG. 2 shows paste 22 on both the positive and negative current collector, the paste may be coated on only the positive current collector 16 or the negative current collector 18. In fact, neither the positive or negative current collectors 16, 18 need to be coated with paste 22, since the active material can be formed through a Plante formation process.

At least the positive electrode 20, and preferably both the positive and negative electrode 20, 40, include a current collector as described herein, i.e., a lead or lead alloy substrate 12 and a tin cladding 14 (see FIG. 1). The combination of an adjacent positive electrode 20 and negative electrode 40 combined with the separator 30 separating them form a unit cell 50 (the space between the electrodes and separator is for the sake of clarity only; typically, the electrodes and separators are closely packed together). In the case in which the current collectors are not coated with paste, the combination of a positive current collector 16, a negative current collector 18 and the separator 30 positioned therebetween define a unit cell. A unit cell or combination of unit cells are enclosed together with an electrolyte in a container (not shown) to yield a battery. In the battery, the positive electrodes are electrically connected to a common positive terminal, and the negative electrodes are likewise connected to a common negative terminal (not shown).

The current collectors or electrodes in the battery can be arranged in a variety of physical configurations with respect to one another. Commonly used configurations include a series of vertically or horizontally stacked plates, or a spirally wound configuration wherein a continuous positive and negative current collector or electrode are spirally wound around each other with a porous separator separating them (the so-called "spirally wound" configuration).

In one preferred embodiment, the battery of the current invention is similar to that described in U.S. Pat. Nos. 5,047,300, 5,045,086 and 5,368,961 to Juergens, wherein the current collectors described herein are substituted for those described in the Juergens' patents. The foregoing patents are assigned to the assignee of the present invention and are incorporated herein by reference.

Batteries based upon the Juergen's design utilize very thin plates or electrodes which have a thickness of 0.01 inches or less. Use of the present current collectors in these types of batteries are preferred because of their exceptionally high discharge and charge rates. However, the present invention is not limited to cells having such thin plates, and is applicable to cells having a wide variety of electrode and paste thicknesses.

For example, as noted above, the current collectors of the present invention typically have a thickness of less than 0.07 inches, preferably have a thickness of less than 0.007 inches and most preferably have a thickness of about 0.002 to 0.003 inches. The paste thickness on the positive current collector generally can be from 0 to 0.015 inches thick; the thickness of the paste on the negative current collector generally ranges from 0 to 0.011 inches. Preferably each layer of active material coated on each side of the current collector has a thickness of about 0.002 to 0.004 inches or less. The positive and negative electrodes preferably have a total thickness (current collector plus coats of paste on each side) of about 0.009 to 0.015 inches. The spacing between positive and negative electrodes is preferably about 0.005 inches or more.

The current collectors described herein can be used in conjunction with any of the standard electrochemically active pastes and paste additives typically used in lead-acid batteries, thus allowing a variety of battery types to be prepared which have longer shelf life, increased cycle life and enhanced capacity. In one embodiment, the electrochemically active paste is a sulfated paste, and preferably is a sulfated paste containing a tin compound. The tin compound is preferably selected from the group consisting of tin sulfate, SnO, metallic tin, tin (II) salts and tin (IV) salts. In an especially preferred embodiment, the tin compound is tin sulfate and the concentration of tin sulfate in the sulfated paste is approximately 0.1%–2.0% by weight. If tin compounds are added to the paste, they are preferably added after first preparing a lead oxide and sulfuric acid mixture such as described in U.S. Pat. No. 5,820,639 to Snyder et al. which is assigned to the assignee of the present invention, this patent being incorporated herein by reference. Although sulfated pastes are preferred, unsulfated pastes can be used as well.

The separator material utilized in the batteries described herein can include any of the materials which are known in the art, including those described in U.S. Pat. No. 4,223,379 to Gross et al. and U.S. Pat. No. 4,465,748 to Harris, these patents being incorporated herein by reference. The electrolyte used in the present invention can include any of the electrolytes typically used in lead acid batteries.

The concentration of tin cladding on the surface of the current collector of the current invention can be varied depending on the battery functionality which is desired. The tin cladding is normally less than 4% by weight relative to the combined weight of the lead substrate and the tin cladding. The tin concentration is more preferably between 0.001% and 0.5%, and most preferably between 0.001% and 0.05%. To optimize cycle life while still maintaining good shelf life, preferably the tin cladding concentration is increased (for example, between 0.2% and 0.5%). When shelf life is of primary importance, the tin cladding concentration is preferably adjusted to lower levels (for example, less than 0.01%). However, by adjusting the tin cladding concentration to preferably between 0.03% and 0.09% it is possible to optimize both shelf life and cycle life.

The batteries of the present invention can be manufactured by cladding at least the substrate of the positive current collector with a tin cladding as described above to yield a tin-clad current collector; preferably, the substrates of both the positive and negative current collectors are clad with tin. A coat of electrochemically active paste is preferably applied to at least the positive or negative current collectors, and most preferably both the positive and negative current collectors are coated, although active material can instead be formed through a Plante formation process. A separator such as those described above is then interposed between the positive and negative current collectors. The combination of a positive and negative current collector or positive and negative electrode with the separator located between them define a unit cell. A unit cell, or preferably a collection of unit cells, is encapsulated with an electrolyte within a container to complete the battery. The various size and composition parameters for the electrodes, paste, separator and electrolyte can be varied in accordance with the description of these various elements as set forth above.

The benefits of the batteries according to the present invention, in particular the enhanced shelf life, cycle life and total useable capacity relative to related batteries, becomes particularly obvious through the examples which follow. These examples demonstrate the substantial performance enhancement of batteries utilizing the tin-clad electrode of the present invention over batteries in which the electrodes are prepared from lead-tin alloys.

EXAMPLE I
(Battery with lead-tin alloy (1% tin) current collectors)

Electrochemical cells in which the current collectors were composed of a lead-tin alloy were prepared. The tin concentration in the alloy was 1% by weight. As seen in the photomicrograph of FIG. 8, the tin in a current collector made of a 1% lead-tin alloy is distributed homogeneously throughout the collector (as evidenced by the lack of distinct light (lead) and dark (tin) regions). The current collectors used in the test cells were 0.003 inches thick. Both the positive and negative current collectors were sandwiched between two layers of electrochemically active paste, each layer of paste being 0.003 inches thick; hence the positive and negative electrodes (current collectors plus paste layers) had an overall thickness of 0.009 inches. The distance between electrodes was 0.2 mm. The paste included lead oxide, surfactants and 0.7% tin sulfate by weight (relative to the total weight of the paste).

Figure 9:
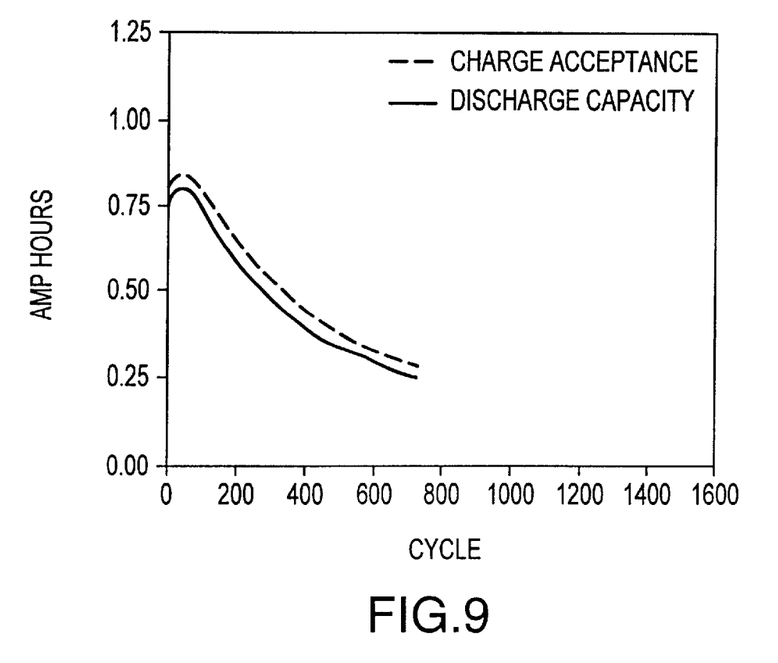
FIG. 9 is a plot for the discharge capacity and charge acceptance characteristics of a battery wherein the battery includes a lead-tin alloy current collector (1% tin).

The discharge capacity and charge acceptance for the test cells were determined. The discharge was conducted at 10 C rate followed by taper charge with termination at 0ΔV. The results are shown in FIG. 9 where discharge capacity (solid line) and charge acceptance (dashed line) are shown in a plot of amp-hours (ordinate) against cycle number (abscissa). The plots in FIG. 9 represent the typical values for a series of tests using similar test cells. As FIG. 9 illustrates, both discharge capacity and charge acceptance for cells utilizing a current collector comprised of a 1% tin alloy decreased dramatically after only about 200 cycles. The test cells typically delivered a maximum of 0.8 amp-hour and only 397 cycles at 50% of the initial amp-hour rating. The total useable capacity of the test cells was generally only 241 amp-hour. Cells of this type typically have a shelf life of 2–5 months.

EXAMPLE II
(Battery with tin-clad current collectors (0.33% tin))

A comparative test was conducted with several electrochemical cells utilizing a current collector of the present invention. The positive and negative current collectors were comprised of a substantially pure lead substrate and a tin cladding of substantially pure tin, wherein the concentration of the tin cladding relative to the combined weight of the lead substrate and tin cladding was 0.33% by weight. In all other respects, the cell construction was as described in Example I. The tin concentration on the current collector surface for such current collectors is relatively high as shown in FIG. 3 and 4 (the dark patches are essentially 100% tin; the light regions are areas of lead which are exposed at the current collector surface).

Figure 10:
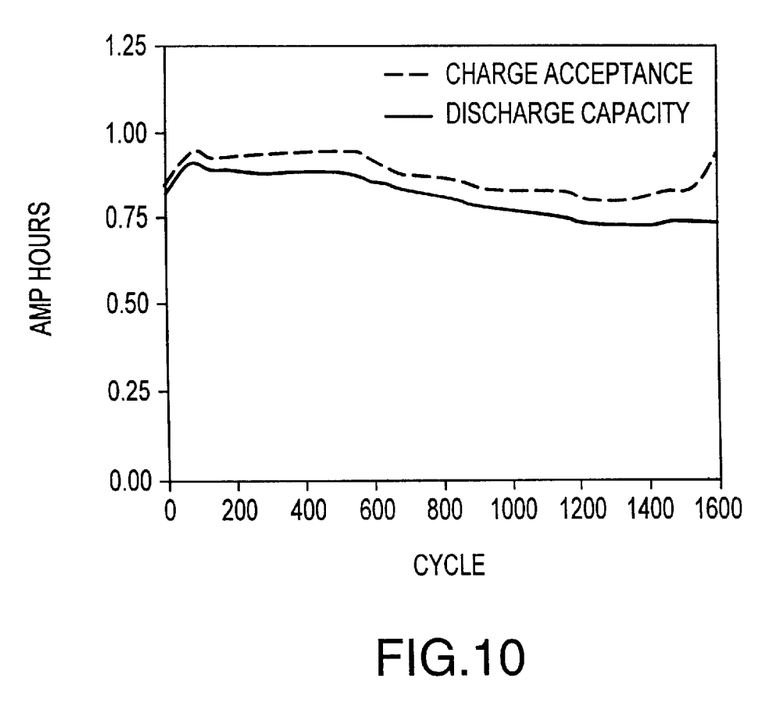
FIGS. 10 and 11 are comparative tests showing the discharge and charge acceptance characteristics of a battery provided according to the present invention (current collectors comprising 0.33% and 0.05% tin-clad foils, respectively).

The testing was performed on several different cells of the same construction according to the protocol described in Example I. The typical discharge capacity and charge acceptance values for such cells is shown in FIG. 10. As FIG. 10 illustrates, both discharge capacity (solid line) and charge acceptance (dashed line) for test cells of this type remain fairly constant until 1600 cycles, a significant increase compared to the 200 cycles delivered by the cells described in Example I. The cells described in this example, typically delivered a maximum of 0.9 amp-hour and 1866 cycles at 50% of the initial amp-hour rating. The total usable capacity of the cells was typically 1453 amp-hour. Thus, the electrochemical cells having 0.33% tin-clad current collectors showed a greater than 4-fold increase in cycle life and approximately a 6-fold increase in total usable capacity compared to similar cells using the 1% lead-tin alloy current collectors. The shelf life of this type of cell typically ranges from 2–5 months.

It is believed that the exposed lead in a current collector having a 0.33% tin cladding reacts with the sulfuric acid electrolyte to form PbO and $PbO_2$ and lead sulfate which in turn passivates the corrosion layer, thus protecting the lead against further corrosion. However, the relatively small amount of exposed lead (relative to current collectors with a lower concentration of tin cladding) means that a relatively small amount of protective layer is formed. The relatively high concentration of tin is believed to dissolve in the sulfuric acid electrolyte to produce tin oxide or tin sulfate. Because the tin corrosion products are conducting, they are able to maintain the conductivity of the current collector as well as the positive active material, thereby significantly increasing cycle life. However, given the elevated tin concentration at the surface, relatively more electrolyte is consumed compared to current collectors having lower tin concentrations. Thus, cells having current collectors with a tin cladding concentration in approximately this range or above have excellent recovery from deep discharge as well as cycle life; however, self-discharge reduces shelf life compared to cells using current collectors with lower tin cladding concentrations.

EXAMPLE III
(Battery with tin-clad current collectors (0.05% tin))

A second comparative test was conducted with several electrochemical cells utilizing a current collector of the present invention. The positive and negative current collectors were comprised of substantially pure lead and a tin cladding of substantially pure tin, wherein the concentration of tin cladding relative to the combined weight of the lead substrate and tin cladding was 0.05% by weight. In all other respects, the cell construction was as described in Example I. The distribution of tin at the current collector surface is shown in FIG. 6 and 7, where again the dark regions are essentially pure tin and the light regions are lead. At this lower tin concentration, large areas of lead break out through the tin cladding and are exposed at the current collector surface.

Figure 11:
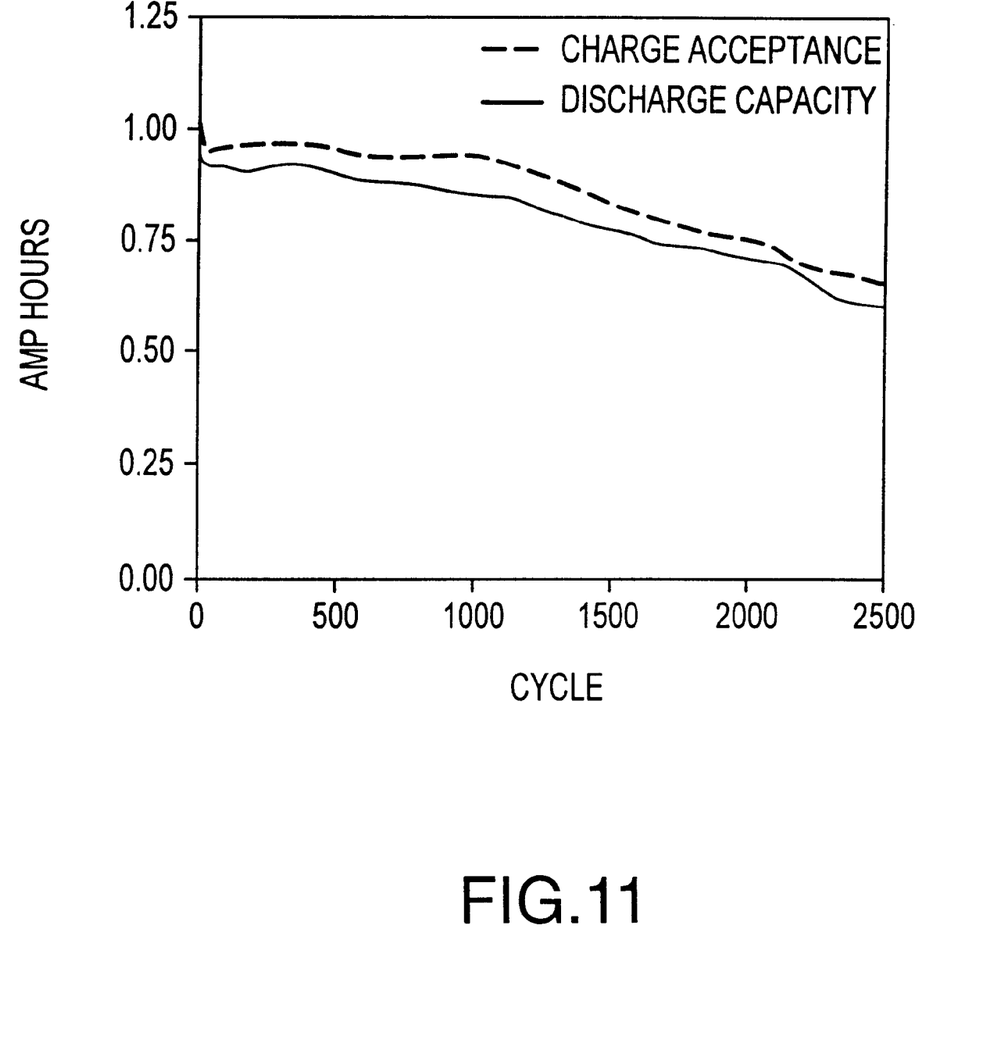

The discharge capacity and charge acceptance were determined as described in Example I. FIG. 11 shows the typical discharge (solid line) and charge acceptance (dashed line) performance for test cells of this construction. As FIG. 11 illustrates, both discharge capacity and charge acceptance for cells utilizing current collectors composed of a lead substrate clad with a 0.05% tin cladding remain fairly constant until 1400 cycles compared to only 200 cycles for the cells using the lead-tin alloy current collectors described in Example I. The cells typically delivered a maximum of 1.0 amp-hour and 2841 cycles at 50% of the initial amp-hour rating. The total usable capacity of the cells was 2177 amp-hour compared to 241 amp-hour for the cells using the 1% lead-tin alloy current collectors described in Example I. Thus, cells having current collectors which included the 0.05% tin cladding exhibited an increase in cycle life of about 7-fold and about a 9-fold increase in total useable capacity relative to the 1% tin alloy cells described in Example I.

In this case, because relatively large regions of lead are exposed, the lead can react with the sulfuric acid electrolyte to form non-conducting species on the current collector surface which protects the lead from further corrosion. The exposed tin at the surface, however, can react with the acid to form the necessary conducting corrosion products (tin oxide and tin sulfate) to maintain conductivity at the current collector. The small electrical paths created by the small particles of tin at the surface of the current collector allow electron flow through the insulating layer to improve cycle life and recovery. The amount of tin corrosion products formed is less than that formed at higher tin concentrations. As compared to cells using current collectors with higher tin concentrations, the increased passivation of the current collector increases shelf life to typically between 6–12 months. However, there is sufficient tin at the surface of the current collector so that cycle life performance is still excellent. A further reduction in tin concentration can be used in cells to achieve higher shelf life, even up to 24 months.

The results for the preceding examples are summarized below in Table I. Batteries having a tin cladding concentration of between approximately 0.03 to 0.09% have both very high cycle life and shelf life performance, significantly above that achieved with prior art batteries, including those with current collectors prepared of lead-tin alloys. However, even at other tin concentrations, cells utilizing the tin-clad current collectors of the current invention outperform other prior art cells. At higher tin concentrations, the cells demonstrate excellent recovery from deep discharge and stand and have increased cycle life; at very low tin concentrations, shelf life performance can be optimized. There is an optimal level of tin concentration at which both cycle life and shelf life are maximized. Although increased tin concentration generally acts to increase cycle life, at tin concentrations above certain levels corrosion of the foil is increased to a point that cycle life is affected. The optimal level of tin for optimizing both cycle life and shelf life appears to be approximately 0.03% to 0.09%.

The foregoing examples are to be considered in all respects as illustrative of the current invention rather than to be restrictive. It will be appreciated by those skilled in the art that additions, modifications, substitutions and deletions not specifically described herein may be made without departing from the spirit and broad scope of the current invention.

TABLE I

| Current Collector Composition | Cycle Life at 50% of initial rating (cycles) | Capacity (amp-hr) | Total Usable Capacity (amp-hr) | Shelf Life (months) |
| --- | --- | --- | --- | --- |
| lead-tin alloy (1% tin) | 397 | 0.8 | 241 | 2–5 |
| 0.33% tin cladding | 1,866 | 0.9 | 1,453 | 2–5 |
| 0.05% tin cladding | 2,841 | 1 | 2,177 | 6–12 |

We claim:

1. A method for manufacturing an electrochemical cell, comprising:
   (a) preparing a positive current collector from a lead substrate in the form of a substantially non-perforated foil having two primary faces by cladding each of said primary faces with a substantially pure tin cladding;
   (b) preparing a negative current collector from a lead substrate in the form of a substantially non-perforated foil having two primary faces by cladding each of said primary faces with a substantially pure tin cladding;
   (c) interposing a separator between said positive and negative current collectors to define, in combination, a unit cell; and
   (d) encapsulating said unit cell, or a collection of unit cells, and an electrolyte within a container.

2. A method according to claim 1, wherein said step of preparing said negative current collector includes cladding an outer surface of a lead substrate with a substantially pure tin cladding.

3. A method according to claim 1, wherein said lead substrate is at least 99.9% pure lead.

4. A method according to claim 1, wherein said lead substrate is a lead alloy.

5. A method according to claim 1, wherein said tin cladding is at least 99.9% pure tin.

6. A method according to claim 1, wherein said tin cladding is less than 4% by weight relative to said positive current collector.

7. A method according to claim 1, wherein said positive and negative current collector have a thickness of less than 0.07 inches.

8. A method according to claim 1, further comprising applying a coat of electrochemically active paste to at least one of said positive and negative current collector.

9. A method according to claim 8, wherein said electrochemically active paste is a sulfated paste, said sulfated paste including tin sulfate wherein the concentration of tin sulfate in said sulfated paste is between 0.1% and 2.0% by weight.

10. A method for manufacturing an electrochemical cell, comprising:
    (a) preparing a positive current collector by cladding an outer surface of a lead substrate with tin to form a tin cladding on said lead substrate, said tin cladding forming a noncontinuous layer over said outer surface of said lead substrate such that interspersed regions of exposed lead substrate are located between pockets of tin cladding at a surface of said positive current collector;
    (b) preparing a negative current collector;
    (c) interposing a separator between said positive and negative current collectors to define, in combination, a unit cell; and
    (d) encapsulating said unit cell, or a collection of unit cells, and an electrolyte within a container.

11. A method according to claim 10, wherein said step of preparing said negative current collector includes cladding an outer surface of a lead substrate with tin to form a tin cladding on said lead substrate, said tin cladding forming a noncontinuous layer over said outer surface of said lead substrate such that there are interspersed regions of lead and particles of tin at a surface of said positive current collector.

12. A method according to claim 10, wherein said lead substrate is at least 99.9% pure lead.

13. A method according to claim 10, wherein said lead substrate is a lead alloy.

14. A method according to claim 10, wherein said tin cladding is between 0.01 and 100 microns thick.

15. A method according to claim 10, wherein said tin cladding is less than 4% by weight relative to said positive current collector.

16. A method according to claim 10, wherein said positive and negative current collector have the form of a substantially non-perforated foil.

17. A method according to claim 16, wherein said substantially non-perforated foil has two primary faces and wherein a layer of tin cladding is clad to each of said primary faces.

18. A method according to claim 10, wherein said positive and negative current collector have a thickness of less than 0.07 inches.

19. A method according to claim 10, further comprising applying a coat of electrochemically active paste to at least one of said positive and negative current collector.

20. A method according to claim 19, wherein said electrochemically active paste is a sulfated paste, said sulfated paste including tin sulfate wherein the concentration of tin sulfate in said sulfated paste is between 0.1% and 2.0% by weight.

* * * * *